United States Patent [19]
Gilbert

[11] 3,757,978
[45] Sept. 11, 1973

[54] BIAXIALLY ORIENTED BLOW MOLDED ARTICLE WITH RIBS PARALLEL TO SEAM

[75] Inventor: Dixie E. Gilbert, Orangeburg, N.Y.

[73] Assignee: Phillips Petroleum Company, Bartlesville, Okla.

[22] Filed: Dec. 22, 1971

[21] Appl. No.: 210,680

[52] U.S. Cl. ............................................... 215/1 C
[51] Int. Cl. ............................................... B65d 1/44
[58] Field of Search .................. 215/1 C; 220/66, 220/72, 70

[56] References Cited
UNITED STATES PATENTS

| | | | |
|---|---|---|---|
| 2,936,920 | 5/1960 | Wallace | 215/1 C |
| 3,651,186 | 3/1972 | Hall | 264/94 |
| 1,715,683 | 6/1929 | Stevens | 220/72 |
| 3,417,892 | 12/1968 | Schweiger | 215/1 C |
| 3,592,885 | 7/1971 | Goins | 264/94 X |

*Primary Examiner*—Donald F. Norton
*Attorney*—Quigg & Oberlin

[57] ABSTRACT

A blow molded hollow article, such as a bottle, formed under conditions giving biaxial orientation, said bottle having ribs in the bottom wall parallel to the seam.

6 Claims, 4 Drawing Figures

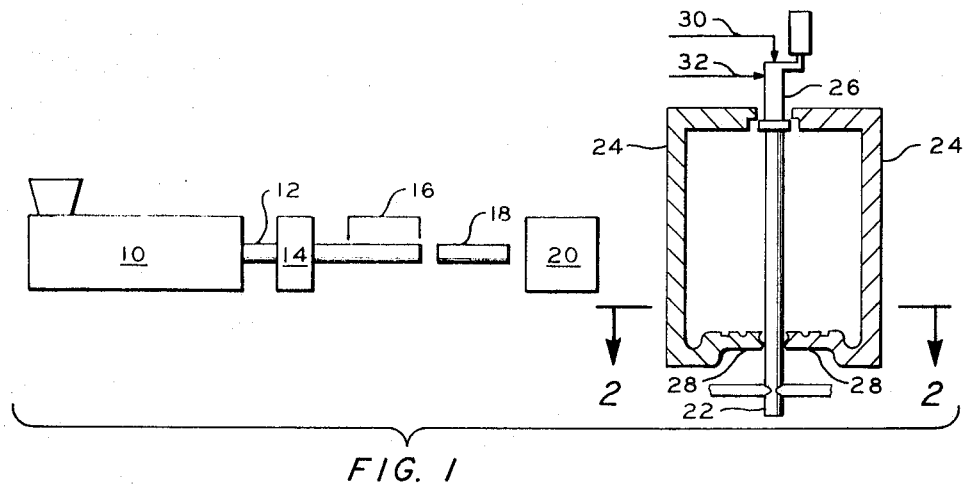
FIG. 1
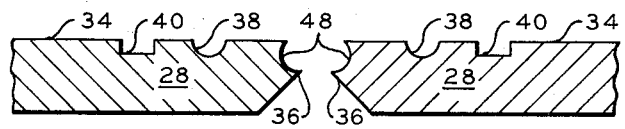
FIG. 3
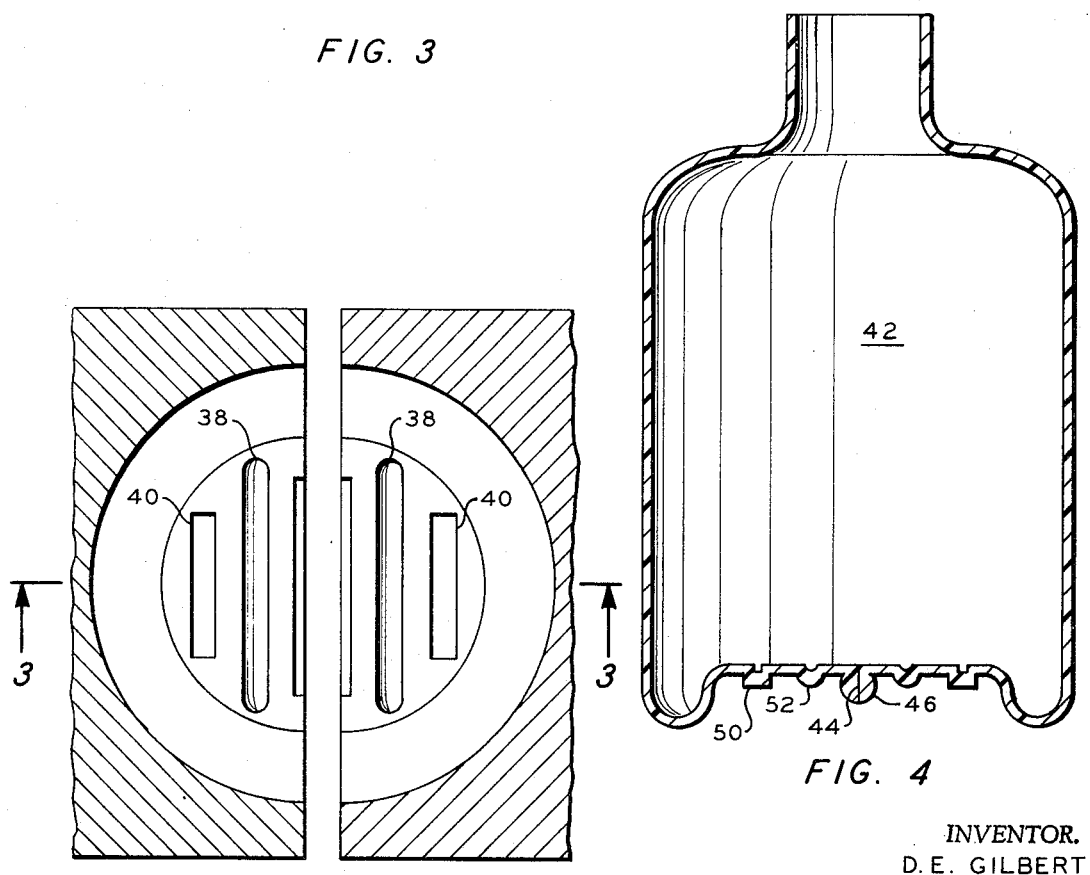
FIG. 4
FIG. 2
INVENTOR.
D. E. GILBERT
BY *Luigi & Oberlin*
ATTORNEYS

BIAXIALLY ORIENTED BLOW MOLDED ARTICLE WITH RIBS PARALLEL TO SEAM

BACKGROUND OF THE INVENTION

This invention relates to biaxially oriented hollow articles such as bottles.

Hollow articles have traditionally been made through blow molding techniques by extruding a molten parison from an annular die orifice and thereafter closing mold parts about this freshly extruded material which is then expanded by internal fluid pressure to conform to the mold walls. Recent developments in the blow molding field have included a technique for forming parison preforms at orientation temperature to give a biaxially oriented product having exceptionally high strength. Such techniques are broadly disclosed in Turner et al., U.S. Pat. No. 3,390,426, and Wiley U.S. Pat. No. 3,288,317, for instance. While the parison preforms could be formed with a closed end initially by injection molding, the simplest and most economical manner of forming the preforms would be to extrude a continuous tube and cut same into individual work pieces which are thereafter sealed at one end during the molding operation. This, however, necessitates accomplishing the seemingly incompatible task of performing the fabrication at a temperature low enough to achieve strengthening molecular orientation on stretching and yet high enough that the polymer will seal when the open end is closed off.

SUMMARY OF THE INVENTION

It is an object of this invention to provide biaxially oriented hollow articles having increased resistance to rupture in the area of the bottom seal; it is a further object of this invention to economically produce biaxially oriented bottles from open end parison preforms; and it is yet a further object of this invention to provide a more rupture resistant seal in a biaxially oriented hollow article.

In accordance with this invention walls of one end of an open end parison preform are pressed together to form a seal and the parison expanded while at orientation temperature under conditions such as to give ribs parallel to the thus formed seam.

BRIEF DESCRIPTION OF THE DRAWINGS

In the drawings, forming a part hereof, wherein like reference characters denote like parts in the various views, FIG. 1 is a schematic representation of apparatus for forming bottles utilizing the instant invention;

FIG. 2 is a view along line 2—2 of FIG. 1 showing the bottom wall forming members of the mold;

FIG. 3 is a view along line 3—3 of FIG. 2 showing a section of the bottom wall forming members in greater detail; and FIG. 4 is a sectional view of a bottle made in accordance with the invention.

DESCRIPTION OF THE PREFERRED EMBODIMENTS

The invention is applicable to the production of biaxially oriented hollow articles from any orientable thermoplastic material. The invention is of particular utility in the production of biaxially oriented bottles from polymers of at least one mono-1-olefin having 2–8 carbon atoms per molecule, preferably polymers of at least one monomer selected from the group consisting of ethylene, propylene, and 1-butene, most particularly polypropylene. Also, amorphous polymers such as PVC, polystyrene, styrene-acrylonitrile resins, butadiene-styrene containing polymers and the like can be used.

By orientation temperature it is meant that temperature at which polymers on stretching exhibit an increase in strength. For crystalline polymers such as polymers of mono-1-olefins having 2–8 carbon atoms per molecule, this temperature is generally within the range of 1°–50°, preferably 10°–30°F below the crystalline melting point. The crystalline melting point can be determined by placing a small sample of the material to be tested on a heating stage of a polarizing microscope and recording the crystalline melting point at the temperature at which the last birefringence disappears on slow heating.

Orientation temperature for amorphous polymers is generally 40°–200°, preferably 75°–150°F below the homogeneous melt point.

The parison preforms are preferably fabricated by extruding a continuous length of tubing which is thereafter cooled and cut up into individual work pieces. These parisons are thereafter reheated while in solid state, for instance in an air oven, to orientation temperature. While at this temperature, the parisons are stretched longitudinally to impart orientation in one direction and than expanded to thus cause the parison to thus conform to the shape of the mold walls. The resulting article is biaxially oriented and has the high strength associated with orientation and further, in the case of material such as polypropylene, has high clarity. The parisons at orientation temperature have the general physical appearance of solid material and normally crystalline polymers are in a still partially crystalline state at which temperature they are not easily sealable.

The ribs parallel to the seam can either be in the form of ridges, grooves, or combinations of the two. In the case of ribs having the appearance of ridges as viewed from outside the article it is noted that the polymeric material of the parison even though at orientation temperature, at which temperature it is not easily moldable, can be blown out by the action of internal fluid pressure to conform to the shape of a mold having the contours for producing these ridges when the parison has been stretched in a longitudinal direction first. Surprisingly, too, the ridges can have sharp edges which are generally to be avoided in conventional molding because they tend to form points of weakness. The ribs can extend completely across the bottom wall of the resulting article or can be shorter than the seal line. Generally the length of the ribs will be essentially the same as the length of the seal line. The height of the ridges or depths of the grooves can vary somewhat and will generally be in the range of one thirty-second to one-fourth inch, preferably one-sixteenth to three-sixteenths inch on a pint to quart size bottle with the size being correspondingly greater for larger articles.

At least one rib will generally be provided on each side of the seal, generally two on each side being provided although a greater number can be utilized. Where more than one rib is utilized on each side the space between the ribs can vary and will generally be a distance of the same general order of magnitude as the width of the rib.

The wall thickness of the article in the area of this seal can vary somewhat depending upon the size of the article and the inherent stiffness of the thermoplastic material. Generally the wall thickness will be in the range of 5-50, preferably 8-35 mils.

Referring now to the drawings, particularly FIG. 1, there is shown an extruder 10 for forming a continuous extrudate 12 which is passed to vacuum cooling and sizing tank 14 and thence to cutting mechanism 16 where it is cut into individual parison preforms 18 which are then passed through oven 20 to heat same to orientation temperature. The thus heated parisons are then transferred by transfer means 22 into position between mold halves 24. The other end of the parison is grasped by thread forming jaw means 26 and relative movement effected between the two ends of the parison to stretch same longitudinally. Thereafter mold halves 24 close with members 28 sealing and severing the parison. Thereafter air is introduced into the parison via line 30 to cause the parison to expand out into conformity with the mold, all of these operations being carried out while at orientation temperature so as to produce a biaxially oriented article. If desired, preblow fluid can be introduced via line 32 prior to closing of the mold halves. FIG. 3 shows in greater detail pinching members 28. These members have an upper bottom wall forming surface 34 with forward most projections 36 which sever the parison. Leading edges of members 28 between projections 36 and upper wall forming surface 34 are in the form of a bead forming cavity. As can be seen from FIGS. 2 and 3 there are longitudinal grooves 38 and 40 which allow molding of the ribs parallel to the seal line. As can be seen, grooves 40 have sharp corners and allow molding of ribs having sharp corners. FIG. 4 shows a cross section of a bottle 42 made in accordance with the invention having a sealing line 44. As can be seen the sealing is along a bead 46 formed by the semicircular mold cavities 48 shown in FIG. 3. Ribs 50 and 52 are shown, which ribs are molded by grooves 38 and 40 in pinching members 28. Of course, there can be provided in the mold, instead of grooves 38 and 40, corresponding raised longitudinal ridges which would produce ribs projecting upwardly instead of downwardly as shown in FIG. 4.

EXAMPLE

Propylene homopolymers having a density of 0.905 grams per cc (ASTM-D 1505-63D), a melt flow of 3.5 (ASTM-D 1238-62T, Condition L), and a crystalline melting point of about 340°F was extruded into tubing having an internal diameter of 0.8-inch and a wall thickness of about 0.125-inch. The tubing was cooled to room temperature and cut into about 7-inch lengths. Each 7-inch length was heated to a temperature of 320°-327°F in an air oven and introduced into a mold as shown in FIGS. 1-3. Sufficient air pressure was introduced into the parison to preblow same slightly and thereafter the mold halves were closed pinching off one end of said parison and sealing same along a line with the formation of a bead along said sealing line and thereafter additional fluid pressure was introduced into the interior of the parison to expand same into conformity with the mold to produce a biaxially oriented bottle with a threaded top having longitudinal ribs parallel to the sealing line.

The resulting bottles were filled with water having a temperature of about 60°F, c'osed with a screw cap and were found to be able to sustain drops of 9-10 feet. Bottles made of identical polymer in an identical manner except without the presence of the ribs parallel to the sealing line failed in identical tests at a height of 4 feet.

While this invention has been described in detail for the purpose of illustration, it is not to be construed as limited thereby but is intended to cover all changes and modifications within the spirit and scope thereof.

I claim:

1. A biaxially oriented hollow article having a seal line in a bottom wall thereof, said seal line being within a bead depending from said bottom wall with at least one rib in said bottom wall running parallel to said seal line and spaced laterally therefrom.

2. Article according to claim 1 wherein said rib is in the form of a groove as viewed from inside of said hollow article.

3. Article according to claim 1 wherein said article is made of a crystalline polymer of at least one mono-1-olefin having 2-8 carbon atoms per molecule.

4. Article according to claim 1 wherein said article is made of polypropylene.

5. Article according to claim 1 wherein said rib has essentially square corners.

6. Article according to claim 1 in the form of a bottle.

* * * * *